Figure 1:
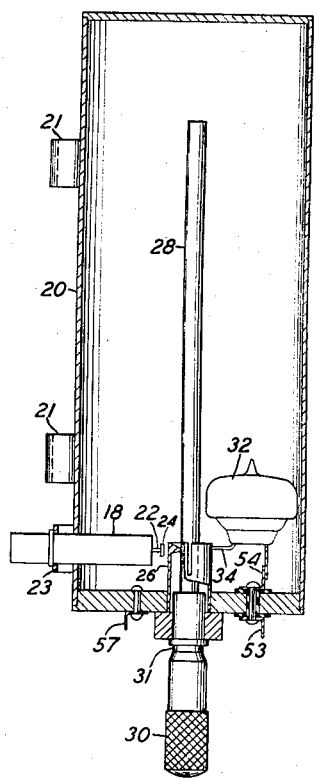

March 18, 1941.  W. H. C. HIGGINS  2,235,521
FREQUENCY INDICATOR
Filed July 26, 1939

INVENTOR
W. H. C. HIGGINS
BY
H. O. Wright
ATTORNEY

Patented Mar. 18, 1941

2,235,521

UNITED STATES PATENT OFFICE 2,235,521

FREQUENCY INDICATOR

William H. C. Higgins, West Orange, N. J., assignor to Bell Telephone Laboratories, Incorporated, New York, N. Y., a corporation of New York Application July 26, 1939, Serial No. 286,681

4 Claims. (Cl. 250—39)

The invention relates to an improved frequency indicator for electromagnetic waves which is particularly well adapted for use with ultra-short waves. The indicator of this invention is of the type which includes an adjustable, calibrated, sharply-tuned resonator and a detector coupled to the resonator.

An object of the invention is to provide a frequency indicator for ultra-short waves which will respond with substantially uniform efficiency over a wide range of ultra-high frequencies.

Another object of the invention is to provide a frequency indicator for ultra-short waves which is of improved efficiency.

Another object is to provide an electromagnetic wave frequency indicator having a simplified and compact mechanical design.

A further object is to provide a frequency indicator which is completely shielded at all radio frequencies including ultra-high frequencies.

Other objects will become apparent during the course of the following description and in the appended claims.

Stated concisely, the essential components of the preferred embodiment of the invention, described in detail hereinafter, are a calibrated, adjustable, sharply-tuned circuit, means for loosely coupling the circuit to a source of the wave to be measured, a detector closely associated with said tuned circuit but relatively loosely coupled therewith and means for indicating the output of said detector.

Particular features of the improved arrangement of the invention are simplicity and perfection of shielding, close and effective cooperative relation between the tuned circuit and the detector obtained without substantial deleterious interaction therebetween, and uniformity of response over a wide range of frequencies. The invention is particularly directed toward the elimination of difficulties encountered at ultra-high frequencies when the arrangements of the prior art, employing a detector mounted outside the tuned circuit and only partial shielding of the ultra-high frequency circuits are employed. By employing a type of tuned circuit in which one member thereof encloses the other and which has a potential node at one end it has been found practicable to mount the detector within the outer member of the tuned circuit, adjacent to the aforementioned end without obtaining so tight a coupling between the tuned circuit and detector that the latter would damp the resonant properties of the former.

Figure 2:
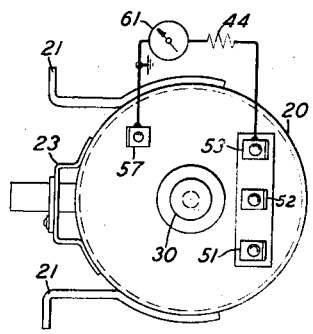

The invention will be more readily understood in connection with the following detailed description of a preferred embodiment thereof and the accompanying drawing in which:

Fig. 1 shows a longitudinal partially sectional view of the tuning unit with coupling means and a detector circuit therein; and Fig. 2 shows an end view of the tuning unit.

In more detail in the preferred embodiment of Fig. 1 concentric pair of conductors comprising outer conductor 18 and inner conductor 22, the latter having electrostatic coupling member 24 on the end thereof, provide means for loosely coupling a source of energy to be measured to the tuned circuit. Incidentally this particular arrangement is one of several features which facilitate the maintenance of virtually perfect shielding of the tuned circuit at radio and ultra-high frequencies.

The tuned circuit comprises an enclosing vessel 20 in the form of a closed right circular cylinder having a highly conductive internal surface, a rod 28 having a highly conductive external surface concentrically supported within vessel 20 and extending through the lower end thereof. The lower end of rod 28 is provided with a micrometer head 30 carrying a suitable scale 31 by means of which the length of the portion of rod 28 within vessel 20 may be accurately adjusted and determined. A slotted, spring contact member 26 encircles rod 28, its upper end making good contact with rod 28 at a relatively short distance from the lower end of vessel 20, the lower end of member 26 being firmly connected to vessel 20. As shown in Fig. 1, this distance is preferably in the order of approximately one-tenth of the length of that portion of rod 28 which is enclosed in vessel 20. Vessel 20 is provided with mounting brackets 21 which may be welded thereto or fastened in any other suitable manner. An additional bracket 23 is provided to support the concentric line comprising conductors 18 and 22.

The detector is a diode type vacuum tube 32 mounted within vessel 20 as shown, its plate lead 34 being directly connected to the upper end of member 26.

The cathode heater element leads and the cathode lead of diode 32 connect to terminate 51, 52 and 53, respectively mounted on the lower end of vessel 20 (shown more clearly in Fig. 2) but insulated therefrom. During operation a suitable power supply should, of course, be connected to terminals 51 and 52 to energize the heater element of diode 32. These leads are, however, capacitatively coupled to the lower end of vessel 20 by the capacity between terminals 51, 52, 53, plates 54, (one on the inside end of each terminal rivet), the rivets holding them in place, and the vessel 20 respectively, the value of the capacitative coupling in each instance being sufficient that substantially no radio or ultra-short wave energy will leave the enclosing vessel 20 along these leads. These capacities should of course be larger when the indicator is to be used at the lower radio frequencies than when ultra-short waves are to be measured. This arrangement provides a detector circuit, the radio or ultra-high frequency path of which is completely enclosed within vessel 20. Furthermore, all leads of the circuit carrying radio or ultra-high frequencies are relatively very short. These features are important since substantially perfect shielding and very low losses resulting from voltage drops in the high frequency leads are thereby insured. In addition, the possibility of developing unwanted resonance effects by combinations of lead inductance and stray circuit capacitances is eliminated. This latter feature is highly desirable since such unwanted resonance effects cause the response of the detector to be non-uniform over frequency ranges near or including frequencies at which such unwanted resonance effects exist.

By placing the diode 32 and its associated leads near the lower end, or short-circuited end, of the tuned circut, unwanted electrical couplings with the tuned circuit are reduced to negligible magnitudes, since the standing waves established in the line will, of necessity, have a potential node at the short-circuited end. The positive coupling provided by connecting the plate to the upper end of member 26 is electrically loose by virtue of connection to rod 28 at a point relatively close to the lower end of vessel 20 so that the detector circuits will not substantially damp the resonant properties of the tuned circuit. By way of explanation, a circuit is said to be loosely coupled electrically to a second circuit, irrespective of the mechanical features of the coupling, when the mutual impedance by which the two circuits are coupled (i. e., the impedance which is common to both circuits) is small with respect to the total impedance of the first circuit. The significant result of electrical loose-coupling, in the present instance, is that, of the total energy present in the first circuit, only a small portion thereof will appear in the second circuit. The second circuit will not, therefore, appreciably alter the electrical properties of the first circuit. Moreover, the small proportion of energy which does appear in the second circuit will be adequate to serve as an index of the amount of energy present in the first circuit if the degree of coupling between the two circuits and the response of the second circuit are substantially constant over the frequency range of interest. The arrangements of the present invention have been devised so as to incorporate all of these desiderata in ultra-high frequency indicators.

Mechanically, the arrangement of Fig. 1 is very compact and vessel 20 is the sole shield required to perfectly shield the radio and ultra-high frequency circuits of the frequency indicator from undesired external couplings.

The rectified current resulting from the detecting action of diode 32 may be lead externally of vessel 20 from terminal 53 through an appropriate resistance load 44 and a suitable microammeter 61 to ground terminal 57 on vessel 20.

A more elaborate indicating system may, of course, be employed such, for example, as that disclosed in the copending application of R. C. Newhouse, Serial No. 286,496 filed July 26, 1939, relating to an improved method and apparatus for measuring the frequency modulation range of an electromagnetic wave, this latter application being assigned to the same assignee as the present application. The current through resistance 44 will, of course, be greatest when the tuned circuit is adjusted to be resonant at precisely the frequency of the electromagnetic wave energy furnished to it.

Fig. 2 is an end view of the frequency indicator shown in Fig. 1 and shows more clearly the arrangement of terminals 51, 52, 53, and 57 and the connections of the external resistance 44 and meter 61 to the frequency indicator.

Where stability with temperature changes becomes important the tuned circuit members may be made of Invar or similar material having negligible dimensional variation with temperature, the conducting surfaces being plated with gold or copper to provide the desired electrical efficiency; or the temperature of the device may be kept constant in any of the ways well known in the art.

Numerous other arrangements embodying the principles of this invention may readily be devised by those skilled in the art without departing from the spirit thereof. The scope of the invention is defined in the following claims.

What is claimed is:

1. In a frequency indicator for ultra-short waves, a closed hollow metallic vessel, a tuning rod extending within said vessel through and in conductive engagement with one end thereof, micrometric means for adjusting and determining the length of said rod extending within said vessel, means for loosely coupling a source of ultra-short waves to said rod within said vessel, a diode detector within said vessel adjacent the end through which said rod extends, the plate of said diode being connected to said rod at a point approximately one-tenth of its enclosed length from the near end of said vessel, and a condenser within and adjacent the near end of said vessel connecting the cathode of said diode to the near end of said vessel.

2. An ultra-short wave frequency indicator comprising a calibrated, adjustable, sharply-resonant, tuned circuit, said circuit including a hollow, cylindrical, substantially closed, member arranged to form a virtually perfect ultra-short wave shield about said tuned circuit and a rod within said cylindrical member and electrically connected to one end thereof, an ultra-short wave detector assembled within said cylindrical member in a position of low potential with respect to energy distribution along said rod, said detector being loosely coupled electrically to said tuned circuit, all high frequency circuits connecting to said detector being confined to said position of low potential within said cylindrical member and all leads from said detector adapted to connect to apparatus and circuits outside said cylindrical member being substantially short-circuited to ultra-short waves by capacity means electrically connecting each such lead to said cylindrical member at the respective points at which such leads pass through said cylindrical member, whereby ultra-short wave energy is confined within said cylindrical member but rectified energy may be freely provided to operate indicating devices located outside said cylindrical member.

3. An ultra-short wave frequency indicating device including in combination a section of concentric line short-circuited at one end and open-circuited at the other, the outer conductor being conductively closed at both ends, the inner conductor extending through the short-circuited end, its length within the outer conductor being adjustable by longitudinal motion through said short-circuited end, a diode detector assembled between the said outer and inner conductors adjacent to the short-circuited end and loosely coupled electrically to said concentric line, all circuits of said detector carrying ultra-high frequency waves being likewise assembled between the said outer and inner conductors adjacent to the short-circuited end, said circuits being made of such short length that negligible ultra-short wave voltage drops are induced therein.

4. In an electromagnetic wave frequency indicator, a tuned circuit comprising a closed hollow metallic vessel, a rod within said vessel in conductive engagement with one end thereof, means for loosely coupling a source of electromagnetic wave energy to said rod, an electromagnetic wave detector within said vessel adjacent the said one end thereof, said detector being loosely coupled electrically to said rod, a current indicating means without said vessel, a lead from said detector carrying rectified energy to said voltage indicating means and capacitative means within said vessel connecting said lead to the said one end of said vessel whereby energy of the frequency of the electromagnetic wave to be measured is prevented from leaving said vessel along said lead.

WILLIAM H. C. HIGGINS.